April 22, 1969     S. J. RICHARDS     3,439,450

POROUS BLOCK FOR CONSERVING SOIL MOISTURE

Filed April 8, 1965

INVENTOR.
STERLING J. RICHARDS
BY Forrest J. Lilly
ATTORNEY

United States Patent Office 3,439,450
Patented Apr. 22, 1969

3,439,450
POROUS BLOCK FOR CONSERVING
SOIL MOISTURE
Sterling J. Richards, Riverside, Calif., assignor to The Regents of the University of California, a corporation of California
Filed Apr. 8, 1965, Ser. No. 446,611
Int. Cl. A01g 7/00; B32b 5/00, 19/00
U.S. Cl. 47—9                 9 Claims

ABSTRACT OF THE DISCLOSURE

A mulch or ground cover is provided in the form of a rigid, porous block which allows irrigation water to easily reach the ground to water plants but at the same time effects conservation of water, retards evaporation from the soil, provides weed control, and other advantages of the usual types of mulch. Pore sizes in the mulch block are in a range to allow water to pass through the block but to retard loss of water either as a liquid by capillary action or as a vapor passing upwardly through the pores. Pore size may be regulated by selection of the sizes of the aggregates used. Practical advantages are permanence and low ultimate cost.

---

The present invention relates generally to mulch blocks or pads and more particularly to a mulch block formed of a mineral aggregate bonded together in such a manner as to provide a pre-formed, permanent mulch covering for the ground surface.

It has been common practice for a long time to cover the surface of the ground with loose organic materials, such as leaves, stalks, straw, sawdust, peatmoss, chips of tree bark, and the like, for one or more of various purposes. Also crushed rock or gravel has been used. Probably the most common reason for covering the ground with a mulch is to conserve water by lessening evaporation from the ground surface, the character of the mulch material being such that irrigation water applied to the surface could still seep through the mulch and into the ground beneath. The proposed mulch retains a smaller amount of water than the organic materials so that more water reaches the soil, and it acts as a protective cover to prevent soil compaction and to inhibit or prevent the growth of weeds and undesired vegetation.

Loose materials, such as those mentioned, have serious shortcomings. In some instances they are subject to being blown away by the wind, and, being small in size, particles of the loose mulch are quickly worked into the soil. In either case, the mulch as such is soon lost. Also, the mulch becomes rather uneven in thickness so that it fails to give adequate service at some points where needed. Organic materials are also subject to deterioration through decay and bacterial action, and in some instances promote growth of undesired pests.

In an attempt to overcome some of these problems, sheet materials have been developed to serve as mulches. However, these are also subject to certain shortcomings, since the sheet materials are normally so thin that they are weak and are easily broken by walking or other traffic on them. Also sheet materials are inclined to be impermeable, so that they prevent the proper application of water and fertilizers to the ground beneath.

Thus it becomes a general object of the present invention to provide a novel type of mulch block, having to a maximum degree the following desirable characteristics.

A mulch block of a permanent type is desired in order that, when once in place, it remains, without requiring continuous maintenance or replacement, and always retaining a desired and known degree of effectiveness.

A permanent mulching structure is preferably porous to the extent that irrigation water and air in adequate amounts can pass through it readily and reach the ground beneath, yet at the same time retarding to the maximum degree loss of moisture either as water or vapor by evaporation from the soil beneath. The advantage is maximum use and conservation of irrigation water.

Being of a permanent nature, such a mulch block is desirably one that can be made strong enough to resist traffic passing over it. The strength of the mulch should be such as to resist breaking up and disintegrating under the traffic to which it is subjected and so should be of a character to permit some variation in thickness. At the same time a rigid block having such characteristics preserves the soil from compaction as a result of the traffic and thereby reduces the amount of cultivation of the soil required.

Such a mulch block is preferably made of inexpensive materials and by simple and economical processes in order that the product is comparatively inexpensive, thereby rendering its widespread use economical.

Additionally, a desirable characteristic of any mulch block but particularly one of the permanent type is that it is inert with respect to the soil, thereby not releasing to the soil any compounds that would inhibit plant growth or change the character of the soil.

These objects are achieved according to the present invention by providing a porous block comprising a rigid block of water insoluble material having water transfer passages extending continuously through the block between the upper and lower faces. For maximum effectiveness as a mulch, the passages in the block have a minimum effective diameter in substantially all cases of more than about 0.3 millimeter and less than about 1.2 millimeters, and preferably not more than about 0.6 millimeter.

The sizes of such passages cannot be determined or controlled directly, but only indirectly by selection of properly sized aggregate and proper quantity of binder for the block, which comprises about 80% of mineral aggregate in the size range of ⅜ inch to ¹⁄₁₂ inch with the remainder about equal parts of fine aggregate, as fine sand, normally 0.3 mm. or less, and Portland cement as a binder. Other binders may be used but may not be economically attractive.

How the above objects and advantages of the invention, as well as others not specifically mentioned, are attained, will be better understood by reference to the following description and to the annexed drawing, in which.

Figure 1:
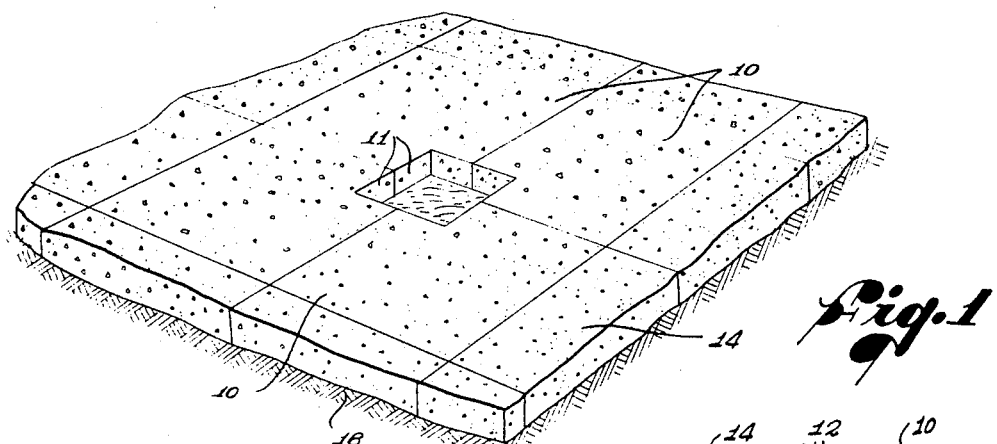
FIG. 1 is a perspective view of a plurality of mulch blocks constructed according to the present invention as they appear in use.
Figure 2:
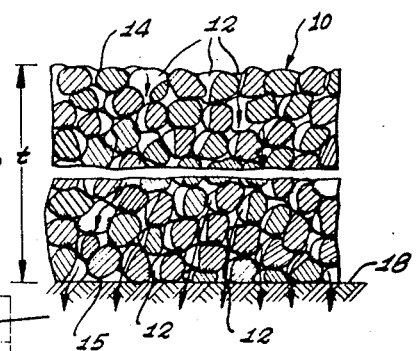
FIG. 2 is a diagrammatic section through a block showing at an enlarged scale the particles of aggregate in the block and the water transfer passages extending through the block.

The mulch block of the present invention, indicated generally at 10 in FIG. 1, is a rigid, integrated structure comprising a plurality of pieces of aggregate, typically rock or any other suitable mineral, bound together into a permanent, rigid mass by a suitable binder such as Portland cement or the like.

In size or dimensions of blocks 10, there is considerable latitude of choice. Test blocks about 2 inches or 5 cm. thick are known to be highly effective as mulch and to have adequate strength. If greater strength is desired, a thicker block may be used; and likewise a thinner one where less strength is required. Probably about 50% increase or decrease in thickness from the test blocks is a practical thickness range.

The horizontal dimensions may be selected to give any size or shape desired depending in part on the maximum weight per block that is practical. In FIG. 1 the blocks are each made generally rectangular as this shape provides flexibility in use and arrangement of a number of blocks assembled to cover an area larger than one block. Corners may be recessed as at 11 to form openings through the mulch for trees or other large plants.

These blocks are described as porous because they have numerous small water transfer passages 12 which extend through the block between the opposite surfaces at the top and bottom of the block. While in fact these passages are of such a nature that they are interconnected laterally and therefore extend in other directions, it is with the vertical extent of these passages between the top and bottom faces 14 and 15, respectively, of the block that the present invention is especially concerned. Each block rests surface 18 of the soil.

If these water transfer passages 12, hereinafter usually referred to as pores, are less than a certain size, they do not drain free of water after irrigation water is applied to the upper surface of the mulch block and the pores then, remaining filled with water, more or less continuously conduct liquid water by capillary action to the upper surface 14 of the blocks where water evaporation can take place at a rate almost as great as that at the surface 18 of the soil.

Pores larger than this certain minimum value allow water to pass freely through the block to the soil and then they drain, leaving initially water films on the surfaces of the passages 12 and, later, eventually drying. If most or all the pores are large enough to drain in this manner there is no re-supply of water from below the block. Both theory and laboratory observations later mentioned indicate upward film flow of water over the passage surfaces does not occur and the passages dry out. On the other hand, when the pores are large enough, i.e., above a certain maximum size, water vapor which evaporates at the surface of the soil beneath the block is able to diffuse upwardly through the pores out into the air so rapidly that the blocks are relatively ineffective for their purpose of reducing the loss of water by evaporation. In between these two conditions is a zone of optimum pore size which, as mentioned, enables the block to act essentially as a one-way valve for water; that is, the water passes through the block and drains out of the pores with sufficient rapidity to admit irrigation water freely to the soil and at the same time the pores are small enough that they dry out and do not transmit an appreciable amount of water or water vapor to the atmosphere above.

The designed pore size is in practice obtained by selecting the aggregate by particle size, so that the particles of aggregate, when cemented together, produce the desired size, or range of sizes, of water transfer passages 12 in the interstices between particles of the aggregate.

To achieve this result, the preferred mulch block is made from a properly sized rock aggregate with a minimum amount of Portland cement as a binder. A degree of uniformity of the aggregate size utilized is a means to control the size of the pores within the blocks.

Although the total voids in a block normally run between 30% and 40% of the volume of the block, it will be understood that the total percentage of openings in the block is not a critical characteristic. Rather it is the diameter of the pores that is of primary concern. Because the pores are all irregular in cross section, changing in diameter throughout their length, and because they generally consist of a number of interconnected passages which intercommunicate three-dimensionally, a size designation of the pores is not possible in a precise sense. Although no truly cylindrical tubular passages exist extending through a block, an approximate and helpful theory for the proper sizing of the pores can be based on the assumption that the pores resemble in action or function a series of vertical tubes of varying cross sections, which behaviorally approximate circular cross sections. Under the circumstances, it will be appreciated that the true diameter of any pore in any position along its axis is only a mean or average value of the diameter. However in calculating the desirable pore diameter, it is not the average diameter throughout the length of the tube that is of basic concern, but rather the minimum effective diameter between surfaces 12 and 14 which presents a constriction that would hold water in connected pores before allowing air to enter. In this analysis the capillary tube equation is useful and valid. Even though it applies strictly to cylindrical tubes, it demonstrates the analogous or equivalent conditions to be achieved. This equation is $D = 4T/\rho g h$ where $h$ is a height above a free water surface to which the water rises in the tube;
$D$ is the diameter of the tube;
$T$ is the surface tension of the water;
$\rho$ is density of water (1 gr./cm.$^3$); and
$g$ is the gravitational constant.

For a short length of time after the application of irrigation water on the top surface 14 of the mulch block, the water condition at the soil surface resembles the condition of a free water surface. Hence, the maximum value of $h$ available for draining the pores by gravity is the thickness of the block. Assume that this block is 2 inches thick or approximately 5 centimeters, which is the thickness of the test blocks described later. Computing the effective pore diameter using the capillary tube equation above and assuming $T = 73$ dynes per cm., the minimum effective diameter of the pores is calculated to be 0.6 millimeter. The value of 0.6 mm. in reality assumes a uniform diameter for the entire tube length. Since the pores are irregular in size, it is safe to assume that an actual minimum effective diameter of 50% less or 0.3 mm. may occur in a passage for at least a portion of its length without causing intolerable water loss. The values of 0.6 mm. or 0.3 mm. represent pore sizes that may occurr as constrictions in a pore having a larger mean size; and in a block thicker than 5 cm. the smaller value still represents some margin of safety in practice. Perhaps it would be better, to give a margin of safety, to consider the value of $h$ as being one-half the block thickness or, in this case 2.5 centimeters in which case the computed minimum effective diameter of the pores increases to 1.2 millimeters. Above this effective diameter the pores drain, or substantially so, thus breaking the continuity of the water column in the pores and shutting off evaporation at the surface of the mulch block.

It is evident from the equation that the shorter the column of water, the larger the diameter of the pore can be while remaining large enough to drain completely. Smaller pore diameters than the calculated minimum effective diameter result in capillary tubes which conduct water to the upper surface of the block from which it evaporates. While it is impractical to accurately size the pores or even to actually measure pore diameters physically in a block, yet the computed or calculated minimum effective diameter of the pores is of real value in indicating the practicality and the functioning of the mulch block constructed as described herein and the range of conditions over which is it operable.

From the above analysis it becomes apparent that the acceptable minimum pore size is also a function of block thickness. Using the values given above and solving the capillary equation for $h$ we find that $h$ is closely equal to ⅓ $D$. If the thickness $t$ of the block is equal to $h$ the height to which water will rise, then the minimum effective diameter of the pores should be greater than $D = \frac{1}{3} t$.

As to the upper limits on pore sizes, this cannot be established by analogy to any know situation; but it may arbitrarily be set at some value such as five times the minimum, as this size is small enough to prevent significant vapor transmission.

In order to make a block with a comparable effective pore diameter, several test blocks have been constructed from various aggregates and materials and tested under closely controlled and observed conditions to relate observed data with theory. For example, blocks have been constructed with a 2 inch thickness using a commercial grade of pea-gravel with a nominal size range of ⅜ inch to ¼ inch. Such gravel is made by crushing larger sized rock, so that the individual pieces of aggregate are irregular in shape, but are sized by screening to produce the commercial grade designated as ⅜-inch–¼-inch. Using a mix of 80% by dry volume of pea-gravel of this size, 10% by dry volume of fine sand passing through a standard No. 50 sieve and so having a nominal diameter of 0.3 mm. or less, and 10% by dry volume Portland cement, a block 2 inches thick was cast. The horizontal diameter of the block was sufficient to completely cover soil in a circular pan. Under laboratory conditions which included moderate radiation under a bank of fluorescent lamps and following thorough irrigation at the beginning of the test, the loss of water by evaporation from soil beneath the block was then determined by periodic weighing of the pan with the soil and block in it. The rate of loss of water from soil under the block is indicated by curve 22 in FIG. 3. By comparison bare soil, in another pan of the same size to which a comparable amount of water had been added, but without any mulch cover, lost water by evaporation at a much higher rate as shown by curve 21 in FIG. 3. This latter curve may be considered as representing the maximum rate of loss, the loss being at a lesser rate after the fifth day of observation because of the then comparatively dry condition of the soil.

Figure 3:
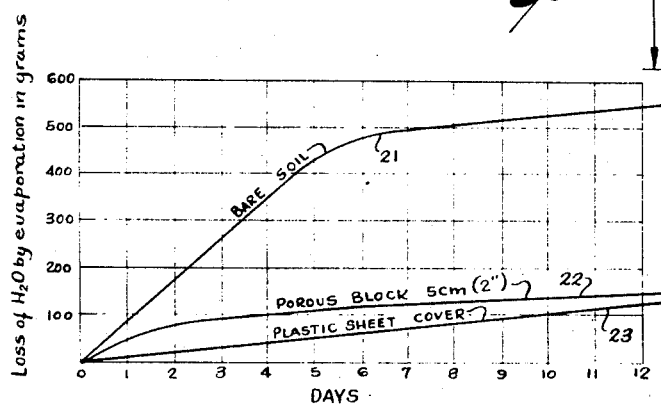
FIG. 3 is a graph showing the comparative effectiveness of the mulch block of the present invention in reducing loss of water by evaporation from a test area under controlled conditions.

For comparison purposes, a third but similar pan was covered with a plastic sheet which itself was substantially impervious to water and yet it allowed the rate of loss as shown by curve 23 in FIG. 3. This loss rate may be considered as a minimum loss rate that can be established for practical purposes since the plastic sheet transmitted only water vapor and was not sufficiently porous to admit water to the ground beneath it.

By this series of tests it was demonstrated that the particular mulch block functioned effectively to reduce water evaporation to a rate approaching closely a minimum rate, since after 12 days the total loss of water was about 150 grams compared with a loss of about 125 grams from soil under the plastic sheet. This was only about 20% more than what may be considered a minimum loss; while by comparison the loss from bare soil was 550 grams of water or 4.4 times the minimum. During these tests, all pans were maintained under the same conditions of temperature and the like which would affect loss rates.

Figure 4:
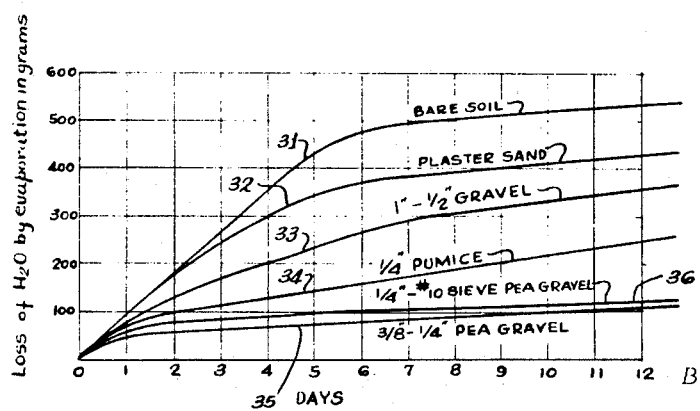
FIG. 4 is another graph showing comparative rates of evaporation of water from soil under similar conditions, using different types of aggregate in a mulch block.

Additional tests were later carried out, all under controlled conditions, to determine the effect upon loss rate using different sizes and types of aggregate. The results are shown in FIG. 4 where curve 31 represents the water-loss rate from bare, uncovered soil and thus represents the maximum rate of evaporation from the soil under the test conditions imposed. Compared with this rate of loss, a mulch block containing 80% by dry volume of coarse aggregate in the ⅜-inch–¼-inch range had an evaporation loss indicated by curve 35. By comparison of curves 31 and 35, it will be seen that the soil pan covered by the mulch block lost only 110 grams of water or about 20% as much moisture at the end of 12 days as it would have lost in the absence of any mulch over the soil.

A similar block of 2-inch thickness made entirely of plaster sand and Portland cement was tested under these same conditions and developed a relatively high evaporation loss as indicated by curve 32. The high rate of loss here is due to the small pore size in the block, these pores being sufficiently small that, as shown by the capillary equation above, the water is able to rise in the pores a sufficient distance that it evaporates rapidly from the top surface of the block. The result is that the plaster sand block offers comparatively little protection against evaporation of moisture. The loss at 12 days is about 80% of the loss from bare soil.

A block made with coarse aggregate of the commercial size 1 inch–½-inch tested under similar conditions produced an evaporation loss as indicated by curve 33. This loss rate is more than 60% of the loss rate for bare soil at 12 days and consequently indicates that gravel in excess of ½-inch produces pores in the block sufficiently large that a substantial portion of the moisture permeates the block and is lost by transfer through the pores. Hence, it appears from these tests that blocks made from aggregate having a nominal size of about ½-inch and larger have pores larger than the acceptable maximum and do not, therefore, have to a high degree the advantages of the present invention.

Another material was tested as shown by curve 34. This consisted of pieces of pumice having a nominal size of ¼-inch. Although the nominal size range of aggregate is within the range of the pea-gravel block indicated by curve 35 it resulted in a substantially higher degree of water evaporation. Thus, curve 34 indicates that the pumice block lost nearly half as much water at the end of 12 days as the bare soil and twice as much as the pea-gravel block. This is believed to be the result of the fine pores in the pumice itself which tend to pull the water up from the ground surface by capillary attraction. Had the pumice particles been coated with a waterproof material to produce non-porous particles in the aggregate, presumably the results would be comparable to the pea-gravel block of which the rate of water loss is shown by curve 35.

In the second set of tests, a block made from the commercial grade of pea-gravel designated commercially as ¼-inch to #10 sieve, was also tested with results shown by curve 36 as being very similar to that of the gravel block indicated by curve 35. A #10 sieve has a nominal opening of 2 millimeters or .08 inch, the standard screen having a tolerance of plus or minus 10%. Reduced to inches, the #10 sieve would give a nominal particle size of about 1/12-inch. Hence, test results indicate that a mulch block having optimum characteristics may be made using a coarse aggregate having a size in the range of ⅜-inch to 1/12-inch.

The test blocks were all 2 inches or approximately 5 centimeters in thickness which produces a block having desirable strength characteristics and permits the blocks to be made in reasonable sizes for horizontal dimensions. A greater thickness produces a heavier and stronger block while a lesser thickness produces a weaker block less able to resist the heavy traffic. At the same time, a block less than 5 centimeters in thickness can produce an adequate mulching effect if the aggregate size is adjusted upward to reduce the number of less than minimum-sized pores.

In making the test blocks a minimum of fine aggregate, i.e., sand, and of Portland cement were used. The object is to bond together the pieces of large aggregate with a minimum of binder in order not to diminish or plug the small pores. The sand aids in forming a binder by filling in very small interstices between pieces of large aggregate. A proportion of 10% Portland cement and 10% sand is adequate to give the desired strength to the block; but the proportions can be increased somewhat if desired to gain greater physical strength.

From the foregoing discussion, it will be appreciated that various changes in the size and shape, as well as in

I claim:

1. A porous mulching block composed of a non-porous, water insoluble, inorganic aggregate and a water insoluble binder in a quantity sufficient to bond the particles of aggregate together at their points of mutual contact to form a rigid block, but in a quantity less than sufficient to fill the voids betwen particles of aggregate thereby forming water transfer passages extending between opposite faces of the block and having a minimum effective diameter allowing water to flow through the passages by gravity but not small enough to cause water to return by capillary action.

2. A porous mulching block as in claim 1 in which the minimum effective diameter of substantially all passages is less than about 1.2 mm. and more than about 0.3 mm.

3. A porous mulching block as in claim 1 in which the minimum effective diameter of substantially all passages is less than about 0.6 mm. and more than about 0.3 mm.

4. A porous mulching block as in claim 1 in which the minimum effective diameter of substantially all passages is approximately equal to ⅓ $t$ where $t$ is the vertical thickness of the block.

5. A porous mulching block as in claim 1 in which the minimum effective diameter of the passages is greater than ⅓ $t$ where $t$ is the vertical thickness of the block.

6. A rigid mulching block comprising:
   rocky aggregate with particles about 80% by volume in the size range of about 1/12-inch to ⅜-inch and 10% by volume fine sand passing a No. 50 sieve; and
   a binder of Portland cement about 10% by volume bonding the particles into a rigid structure with moisture transfer passages extending through the block between particles of aggregate.

7. A rigid mulching block composed of:
   rocky aggregate with particles in the size range of about ¼-inch to ⅜-inch comprising about 80% by volume; and
   a water insoluble binder comprising about 10% by volume bonding the particles into a rigid structure with moisture transfer passages extending through the block between particles of aggregate.

8. A rigid mulching block composed of:
   rocky aggregate with particles in the size range of about 1/12-inch to ⅜-inch comprising about 80% by volume; and
   a water insoluble binder comprising about 10% by volume bonding the particles into a rigid structure with moisture transfer passages extending through the block between particles of aggregate.

9. A rigid mulching block as in claim 8 which has a thickness not in excess of substantially 2 inches.

References Cited

UNITED STATES PATENTS

| | | | |
|---|---|---|---|
| 1,914,592 | 6/1933 | Birchy et al. | 106—86 |
| 2,046,071 | 6/1936 | Harding et al. | 161—168 |
| 2,732,078 | 1/1956 | Records | 210—510 |

ROBERT F. BURNETT, *Primary Examiner.*

W. J. VAN BALEN, *Assistant Examiner.*

U.S. Cl. X.R.

106—97; 161—162, 165, 168